US012576871B2

(12) United States Patent
Gronau et al.

(10) Patent No.: US 12,576,871 B2
(45) Date of Patent: Mar. 17, 2026

(54) METHOD FOR OPERATING A MOTOR VEHICLE, AND MOTOR VEHICLE

(71) Applicant: AUDI AG, Ingolstadt (DE)

(72) Inventors: Hendrik Gronau, Ingolstadt (DE);
Jörg Michael, Ingolstadt (DE);
Christoph Schmutz,
Großmehring-Demling (DE); Thorsten Schrader, Ingolstadt (DE); Werner Wilding, Gungolding (DE)

(73) Assignee: AUDI AG, Ingolstadt (DE)

( * ) Notice: Subject to any disclaimer, the term of this patent is extended or adjusted under 35 U.S.C. 154(b) by 29 days.

(21) Appl. No.: 18/716,452

(22) PCT Filed: Nov. 17, 2022

(86) PCT No.: PCT/EP2022/082265
§ 371 (c)(1),
(2) Date: Jun. 4, 2024

(87) PCT Pub. No.: WO2023/104466
PCT Pub. Date: Jun. 15, 2023

(65) Prior Publication Data
US 2025/0018966 A1      Jan. 16, 2025

(30) Foreign Application Priority Data

Dec. 7, 2021     (DE) ..................... 10 2021 132 143.3

(51) Int. Cl.
*B60W 50/14*          (2020.01)
*B60W 30/10*          (2006.01)
(Continued)

(52) U.S. Cl.
CPC ............ *B60W 50/14* (2013.01); *B60W 30/10* (2013.01); *B60W 30/143* (2013.01);
(Continued)

(58) Field of Classification Search
CPC .. B60W 50/14; B60W 60/0013; B60W 30/10; B60W 30/143; B60W 30/18109;
(Continued)

(56) References Cited

U.S. PATENT DOCUMENTS 10,843,707 B2     11/2020   Gruchalski

FOREIGN PATENT DOCUMENTS

DE      102010028837 A1     11/2011
DE      102013212186 A1     12/2014
(Continued)

OTHER PUBLICATIONS

English Machine Translation of DE-102013217552-A1 (Year: 2013).*
(Continued)

*Primary Examiner* — Andrew J Cromer
(74) *Attorney, Agent, or Firm* — Sterne, Kessler, Goldstein & Fox P.L.L.C.

(57) ABSTRACT
A method for operating a motor vehicle, wherein input data concerning the motor vehicle and/or surroundings and/or a user of the motor vehicle are ascertained, wherein at least one trigger condition dependent on the input data is evaluated, wherein, in the event of the respective trigger condition being met, an indication of an activatable vehicle function (28, 32, 44, 51) associated with the respective trigger condition is output to the user, following which, after detection of a predefined control action performed by the user, this vehicle function is activated immediately or after an additional condition has been met.

12 Claims, 2 Drawing Sheets

(51) Int. Cl.
   *B60W 30/14*   (2006.01)
   *B60W 30/18*   (2012.01)
   *B60W 60/00*   (2020.01)

(52) U.S. Cl.
   CPC .. *B60W 30/18109* (2013.01); *B60W 60/0013*
      (2020.02); *B60W 2540/221* (2020.02); *B60W*
      *2540/30* (2013.01); *B60W 2555/20* (2020.02);
      *B60W 2756/10* (2020.02)

(58) Field of Classification Search
   CPC ......... B60W 2756/10; B60W 2555/20; B60W
      2540/221; B60W 2540/30
   See application file for complete search history.

(56)            References Cited

FOREIGN PATENT DOCUMENTS

| DE | 102013217552 A1 * | 3/2015 | ............. G06F 9/453 |
|----|-------------------|--------|--------------------------|
| DE | 102014211573 A1 | 12/2015 | |
| DE | 102014221132 A1 | 4/2016 | |
| DE | 102015121443 A1 | 7/2016 | |
| DE | 102016222579 A1 | 6/2017 | |
| DE | 102016008365 A1 | 1/2018 | |
| DE | 102016213314 A1 | 1/2018 | |
| DE | 102016216601 A1 | 3/2018 | |
| EP | 3048025 A1 | 7/2016 | |
| EP | 3363706 A1 * | 8/2018 | ......... B60W 50/082 |
| FR | 3105142 A1 | 6/2021 | |

OTHER PUBLICATIONS

Written Opinion of the International Searching Authority directed to related International Application No. PCT/EP2022/082265, with English-language translation attached, mailed Feb. 7, 2023; 12 pages.
International Preliminary Report on Patentability directed to related International Application No. PCT/EP2022/082265, with English-language translation attached, mailed Jun. 5, 2024; 14 pages.
International Search Report of the International Searching Authority directed to related International Patent Application No. PCT/EP2022/082265, mailed Feb. 7, 2023, with attached English-language translation; 6 pages.

* cited by examiner

METHOD FOR OPERATING A MOTOR VEHICLE, AND MOTOR VEHICLE

TECHNICAL FIELD

The present disclosure relates to a method for operating a motor vehicle, in which input data relating to the motor vehicle and/or to an environment and/or to a user of the motor vehicle are determined, wherein at least one trigger condition dependent on the input data is evaluated. In addition, the present disclosure relates to a motor vehicle.

BACKGROUND

Modern motor vehicles have a plurality of vehicle functions which, in particular, serve to adapt the driving operation to the preferences of a driver and to assist the driver during travel. For example, it is often possible to change between different driving modes, for example in order to allow for driving which is as comfortable as possible, or as comfortable-oriented as possible, or as sporty as possible. In addition, a plurality of driver assistance systems are often provided, which are always active in the background after activation—for example, for preventing collisions or reduction collision severity—or which can be used for certain driving situations—for example, parking assistance or fixed following distance. Various driver assistance systems are mentioned, for example, in DE 10 2010 028 837 A1, which proposes adapting parameters of the driver assistance systems as a function of information from an environment sensor system.

The increasing number of vehicle functions available, in particular in higher-end vehicles, can lead to a user forgetting, in a driving situation in which a specific vehicle function would be particularly advantageous, that a suitable vehicle function is available. The problem is even more severe in cases where certain vehicle functions are only available if they have been enabled, for example, upon payment of a fee, or after completion of a driving training. As such, it is difficult for a user to be aware of the complete catalog of potentially activatable vehicle functions. As a result, expedient vehicle functions may remain blocked, since the user is not aware that corresponding vehicle functions are available. In addition, certain vehicle functions, for example a sport driving mode, only have their full added value if the user is trained for a corresponding driving operation. However, to-date, only a relatively small group of users has taken advantage of corresponding training offers.

BRIEF DESCRIPTION OF THE DRAWINGS/FIGURES

Figure 1:
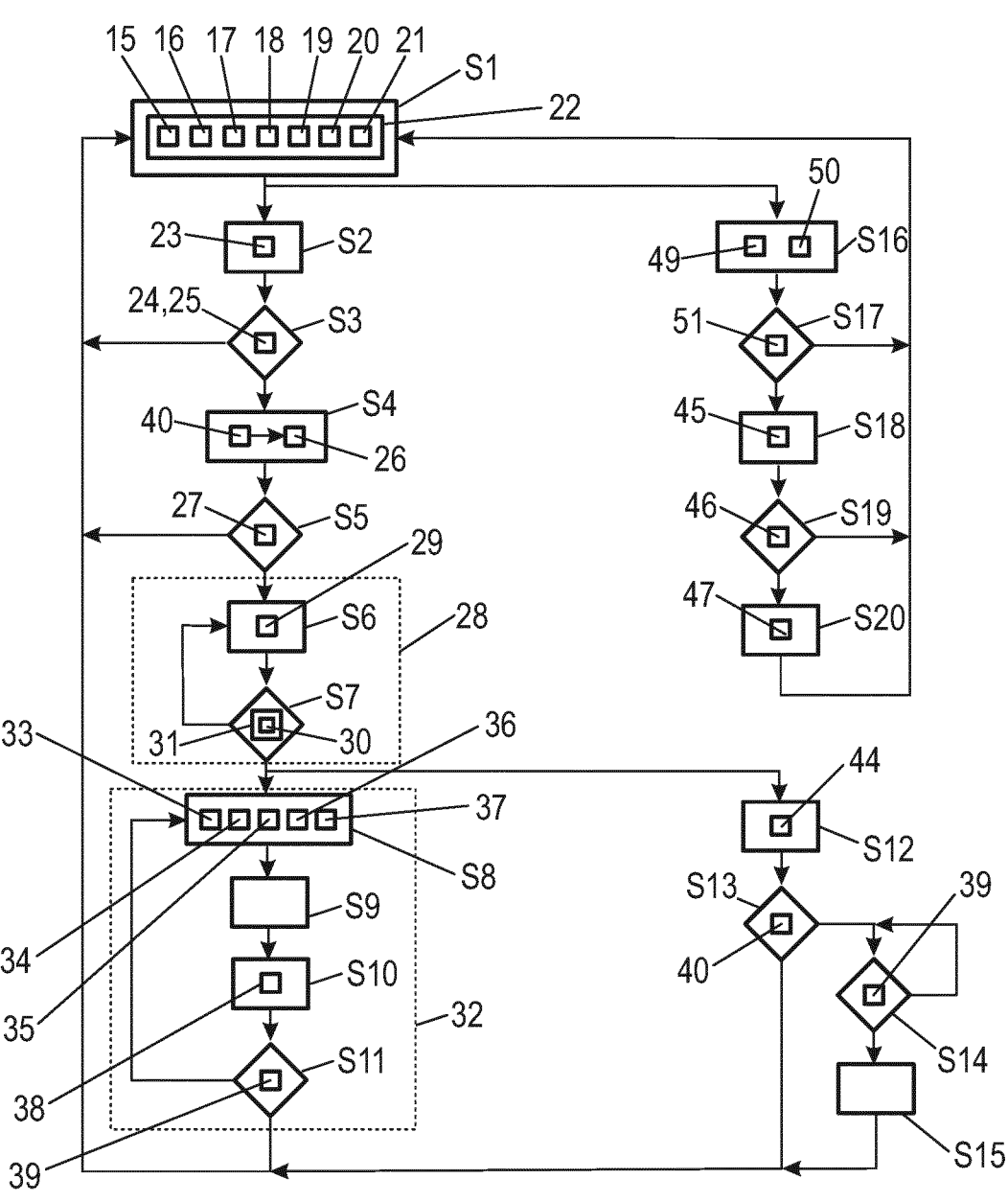
FIG. 1 illustrates a flowchart for one embodiment of the method.

The present disclosure is therefore based on the object of assisting a user in such a way that any vehicle functions implemented in the vehicle can also actually be used without the need to deal with extensive documentation material—for example, lists of vehicle functions available at additional cost—and/or assisting a user to obtain optimal added value from corresponding vehicle functions.

According to one embodiment, the object is achieved by a method of the type mentioned at the outset, wherein, when the corresponding trigger condition is met, a notification regarding an activatable vehicle function assigned to the corresponding trigger condition is output to the user, after which, once a prespecified operating action of the user is detected, this vehicle function is activated immediately or after an additional condition is met.

By means of the method according to one embodiment, a user-which can in particular be the driver of the motor vehicle—can be reminded about rarely-used vehicle functions in cases in which it may be particularly advantageous in a specific driving situation to use them. The driving situation can be detected on the basis of the input data. In particular, no complex operating action is required to activate the corresponding vehicle function. Rather, for example, only a simple confirmation by a voice command, pressing a button, or touching a specific region of a touchscreen, is necessary.

On the other hand, the method according to one embodiment can contribute to training users in the use of certain vehicle functions that have not yet been used or are only rarely used, for example. It can thus be used in particular to implement training functions, which will be explained in more detail later. In this case, it is in particular possible for vehicle functions that are not enabled for use in the usual driving mode to be provided, for example, for a specific time or for driving through a specific route portion, when the trigger condition is met, in order to enable the user to test corresponding functions in a suitable driving situation.

The input data and/or at least parts of these input data determined in the method can additionally be used for other purposes, and/or can be input data which are already determined in the motor vehicle for another purpose. For example, the vehicle tuning can be automatically adjusted on the basis of the input data. For example, the drive train and/or the chassis can be parameterized differently on the basis of the input data depending on whether the vehicle recognizes driving in a city, on a country road, on a freeway, on mountain roads, or on a racetrack.

The input data can also enable particularly visually interesting route portions to be detected, and, for example, enable automatic image capture by sensors which are already present in the motor vehicle. These can be stored for a prespecified time, for example 24 hours, after which the user can transmit them to a smartphone, post them in social networks, or can otherwise further process them, for example. After the storage period, the image data can be deleted.

In addition, or alternatively, the input data can also be taken into account in order to recognize hazard points and, for example, to output information relating thereto to a display device, in particular a head-up display, or to give instructions for a detour or directions to regions with safe driving conditions. For example, notifications can be given regarding accidents, black ice, or aquaplaning risk.

For example, assistance systems known per se, such as adaptive cruise control, a lane keeping systems, stop-and-go functions, parking assistant, etc., can be used as activatable vehicle functions. However, the vehicle function can also serve to change the vehicle configuration, i.e., for example, to adapt at least one parameter of the chassis and/or the drive train in order to switch, for example, between a particularly energy-efficient driving mode, a particularly sport driving mode, and a comfort mode, or the like. Particularly preferably, at least one of the activatable vehicle functions implements a function for training and/or instructing the user and/or driver of the motor vehicle in order to improve his driving abilities and/or his awareness of other vehicle functions.

According to the input data, a currently-travelled route portion or a route portion which will potentially be travelled in the future by the motor vehicle can be selected, wherein, by means of the vehicle function or at least one of the vehicle functions-after its activation-instructions are repeatedly output to the user in order to guide the motor vehicle to a starting point of this route portion, and/or to instruct the user regarding a driving behavior that is optimal with respect to at least one target variable within the route portion.

In particular, route portions which are particularly well-suited for driver training can be detected on the basis of the input data. This will be explained in more detail later. If such a route portion is found on or near a planned or predicted route, a corresponding training can be offered to the driver and/or user. If the prespecified operating action is used to accept, vehicle components can in particular also be configured for the training—i.e., for example, parameters of the chassis, traction control, a drive train, and/or a regenerative operation can be adapted. If the route portion is located beyond a planned or predicted route, a guidance to the starting point can also automatically take place. In this case, for the vehicle function that outputs the instructions for optimal driving behavior, the additional condition can be that the starting point is reached, for example—so that the output of instructions for optimizing the target variable can take place in particular exclusively within the route portion.

For example, a travel time required for driving the route portion or the energy required to drive the route portion can be minimized as the target variable. Preferably, the optimization can take place with boundary conditions, such that, for example, prevailing traffic rules can be observed in the route portion, transverse and/or longitudinal forces occurring can be limited in order to ensure a minimum comfort, and minimum distances from other road users, road boundaries, and other hazard points can be maintained, etc. In addition to an optimization with respect to a single target variable, a plurality of target variables can also be taken into account, so that, for example, a cost function can be minimized. This can be, for example, a weighted sum of energy and time consumption for driving the route portion.

In the simplest case, the optimal driving behavior targeted by the instructions to the driver and/or user can be determined before and/or upon entering the route portion. In this case, in cases where it is detected that this optimal driving behavior cannot be performed—for example, due to existing traffic—the user can be informed, for example, that the current training is being aborted. However, it is also possible to repeatedly calculate the optimal driving behavior while the route portion is being travelled—for example, to take into account an actually-used driving line and/or speed and/or moving objects present in the route portion, for example other road users.

The instructions can be output visually and/or acoustically and/or haptically. For example, instructions can be displayed on a head-up display or another display device, or can be output as a voice output, or haptically as an additional steering torque and/or counter-pressure on the brake and/or accelerator pedal.

According to the input data, a braking point and/or a target driving line and/or a target speed and/or a target acceleration and/or a target regeneration for at least one part of the route portion can be specified for at least one curve in the route portion, wherein at least one of the instructions relates to the corresponding braking point and/or the corresponding target driving line and/or the corresponding target speed and/or the corresponding target acceleration and/or the corresponding target regeneration.

In the simplest case, these variables can be determined from the route profile—that is to say, from input data relating to the surroundings, for example from map data of a navigation system, which in particular can also provide elevation information. Preferably, other input data which will be discussed in detail later can also be used to determine the mentioned variables.

The instructions can, for example, describe the position of the motor vehicle relative to the braking point or to the target driving line and/or indicate deviations from a target speed, target acceleration or target regeneration. Alternatively or additionally, concrete action instructions can be provided—i.e., for example, that the driver and/or user must brake more or less, steer, or accelerate. The instructions can also be instructions for improving driving behavior, based on, for example, a curve that has been traversed previously, wherein the driver and/or user should receive instruction, for example, to brake and/or accelerate and/or to steer earlier or later.

In addition to outputting the instructions, a further vehicle function can be permanently activated, or activated when the additional condition is met, or depending on the operating action and/or the input data, implementing a driver assistance system and/or by which a configuration of the drive train and/or of the chassis and/or of an assistance system of the motor vehicle is changed before or when the route portion has been reached. For example, if sport driving will be trained, a sport mode, for example, can be activated as a further vehicle function, i.e., for example, a harder chassis tuning can be selected, a supplied power increased, i.e., in particular a boost operation of an electronic drive or additional drive can be used, and/or a traction control can be adapted. On the other hand, comfort functions can also be activated for a specific route portion, for testing or for demonstration or explanation purposes. For example, lane keeping assistance or a stop-and-go assistance can be activated.

When the trigger condition is met, a plurality of alternatives can also be offered to the user as part of the notification, and the user can select among the alternatives by his operating action. If, for example, a route portion suitable for training is detected, the user can, for example, select whether he would like to continue driving normally, i.e., without training, to use the training function without using additional vehicle functions, or would like to use a specific additional function during the training.

The trigger condition or one of the trigger conditions can be met, or may only be possible to meet, if a route portion of the, or a planned or predicted, route of the motor vehicle, and/or a route portion whose starting point can be reached starting from the route within a certain distance and/or travel time, each of which is less than a pre-specified distance threshold, satisfies a route portion condition. For example, the route portion condition can be met if the route portion is particularly well-suited for driving training—i.e., for example, has S-curves or an otherwise demanding route profile—or if, in this route portion, certain vehicle functions, for example comfort functions, are likely to be able to be demonstrated.

The route portion condition can then be met, or may then only be met, if the average curvature and/or the angle between tangents of the corresponding curve at its end points, for one or more curves of the route portion, and/or a mean slope or mean absolute slope in the route portion, exceed a corresponding prespecified threshold, and/or if a distance between successive curves in the route portion falls below a pre-specified threshold.

The parameters mentioned indicate that the route portion is particularly challenging, and is thus well-suited for driver training or the demonstration of vehicle functions that are either particular sport-oriented, or are suitable for comfort-oriented vehicle functions. In addition, the mentioned factors indicate the presence of strong slopes, drops, and, due to the curves, expected frequent speed changes, such that the mentioned criteria are also suitable for selecting a route portion which is particularly well-suited to train a particularly efficient driving behavior of the user.

The notification output when the corresponding trigger condition is met can comprise information regarding the associated, activatable vehicle function. In the simplest case, only the name of this vehicle function can be specified; however, short explanations can preferably also be given regarding how the particular vehicle function has an effect on vehicle operation.

Additionally or alternatively, the content of the notification output when the trigger condition is met can depend on whether an activation condition for the vehicle function assigned to this trigger condition is met. The activation condition may be met, for example, only if the vehicle function is permanently allowed or is allowed for a specific number of activations or amount of time in the corresponding motor vehicle. Such an allowance can, for example, be subject to feeds or depend on the vehicle equipment.

Additionally or alternatively, certain vehicle functions can be enabled, for example, only if the user and/or driver meets certain conditions—i.e., for example, has proof of a corresponding driver training, which can also take place as part of the training functions explained above, or has a certain minimum age, or the like.

If the activation condition is not met, the notification can indicate, for example, that the activatable vehicle function is only available for testing or training purposes. Additionally or alternatively, if the activation condition is not met, the notification can comprise information regarding a time limit for using the vehicle function, and/or to the effect that the vehicle function can only be used within a defined route portion, and/or with regard to requirements for enabling it—for example, information regarding certain training requirements or an option to purchase.

The further vehicle function can be activatable exclusively if the trigger condition is met, or if an activation condition assigned to the given vehicle functions is met, regardless of whether the trigger condition is met. If the activation condition is not met, the vehicle function can be activated only upon fulfillment of the activation condition. On the other hand, if the activation condition is not met after the detection of the prespecified operating action, the (further) vehicle function can additionally or alternatively be activated only temporarily, until an end condition is met. By means of the approaches described, it can in particular be achieved that the vehicle function is available only for testing or training purposes, for as long as the activation condition is not met.

The end condition can in particular not be verified if activation condition is met. If the activation condition is met, the vehicle function can remain active until it is, for example, manually terminated, or until a further end condition is met, upon which the vehicle function is terminated independently of whether the activation condition is met. If the vehicle function relates to a change in the configuration of the motor vehicle, then the configuration of the motor vehicle can be transferred into the configuration state present before activations of the vehicle function, or into a prespecified default configuration state, when the vehicle function is ended.

Whether or not the activation condition is met can depend on whether a message has been received previously from a vehicle-external device. Additionally or alternatively, the activation condition can be met if—or can be met only if-a pre-specified further operating action of the user is detected, wherein the further operating action triggers the transmission of a confirmation message to the vehicle-external device. The vehicle-external device can be, for example, a server of the vehicle manufacturer, or the like.

By means of the procedure described, it is achieved that the activation condition can only be met if either an active enabling is carried out by the vehicle-external device, or it is at least informed that the enabling has occurred. This may be relevant, for example, if the release of the vehicle function involved a charge, or, for example, affects insurance costs of the vehicle, or leads to the fact that maintenance intervals are shortened—for example, since higher engine power must be provided.

The input data can comprise a route profile and/or map data relating to a roadway condition and/or information relating to the position of the motor vehicle, and/or position information relating to the user, which in particular relate to the mood and/or the state and/or a driving ability of the user, and/or sensor data from sensors of the vehicle and/or the weather conditions in the vehicle surroundings and/or information regarding traffic and/or dangerous situations located in the vehicle surroundings and/or information received from other motor vehicles and/or infrastructure devices.

Examples of the relevance of the mentioned input data are explained below by way of example for the implementation of the training function explained above as the activatable vehicle function. However, these explanations can also be applied to other vehicle functions.

Based on the position information, the position of the motor vehicle is known with respect to the map data. As such, based on the route profile, in particular with including elevation information, and the road condition, braking points, target driving lines, and the like can be determined in advance-which in the simplest case can be determined on the basis of the traction limits of the motor vehicle itself.

With unexperienced, not-fully-concentrated, or, for example, very fearful or very aggressive drivers, taking into account the occupant information makes it possible to modify the determination in such a way that, for example, longitudinal or transverse accelerations are lowered when the target driving line is departed from, and/or braking points are placed further away from curves, so that driving the route portion according to the instructions is less demanding overall, and, under certain circumstances, driving errors can be compensated for.

On the one hand, sensors on the vehicle can monitor the extent to which the driving of the vehicle corresponds to the instructions, by detecting, for example, pedal actuations, steering angles, and the like; and/or, on the other hand, reduced traction conditions—for example, due to a moist or cold roadway—can be recognized and taken into account, in particular in conjunction with known information about weather conditions.

By taking into account the traffic and/or dangerous situations located in the vehicle surroundings and/or in the route portion, it is possible, for example, to recognize where on the route portion unrestricted travel is possible; and a driver can be informed in advance of other road users and/or dangerous situations, so that, for example, the vehicle can be operated far below its limits in such an area. Corresponding information can in particular be provided by other vehicles or by infrastructure devices.

On the basis of the input data relating to the user of the motor vehicle, a degree of fatigue and/or an attentiveness state of the user can be determined, wherein the fulfillment of the trigger condition or one of the trigger conditions depends on the degree of fatigue and/or the attentiveness state, wherein, when this trigger condition is met, a notification of an at least partially-automated driving operation as an activatable vehicle function is output to the user.

Approaches for detecting a degree of fatigue or an attentiveness state are well known in the prior art, and shall therefore not be explained in detail. For example, steering movements of the driver and/or user can be detected in order to deduce fatigue, operating actions on other vehicle components or the gaze turning away from the roadway can be detected, for example by an interior camera, and blinking times can be determined, and the like.

Whereas, typically when distraction or fatigue is detected, notifications are usually made to the driver and/or user that he should cease driving and/or take a break, in the proposed approach, an alternative—namely, an at least partially-automated driving operation, in particular a completely automated driving—can be offered directly.

In addition to the method according to one embodiment, another embodiment relates to a motor vehicle which is configured to carry out the method. The motor vehicle according to one embodiment can in particular comprise at least one sensor and/or at least one communication device and/or at least one data memory for providing input data, a user interface, and a processing device, wherein the processing device is configured to carry out the method.

The user interface can comprise output means for outputting the notification and input means for detecting the operating action of the user. The processing device can implement the vehicle function itself and/or can control other vehicle components, for example control devices, actuators, or the like, in order to implement the corresponding vehicle function. In addition, it can actuate the user interface or the output device in order to output the notification and detect the input data and/or the operating action via the sensor, the communication device, the data memory, and/or the input means.

Further features explained for the method according can be applied to the motor vehicle with the aforementioned advantages, and vice versa.

Figure 2:
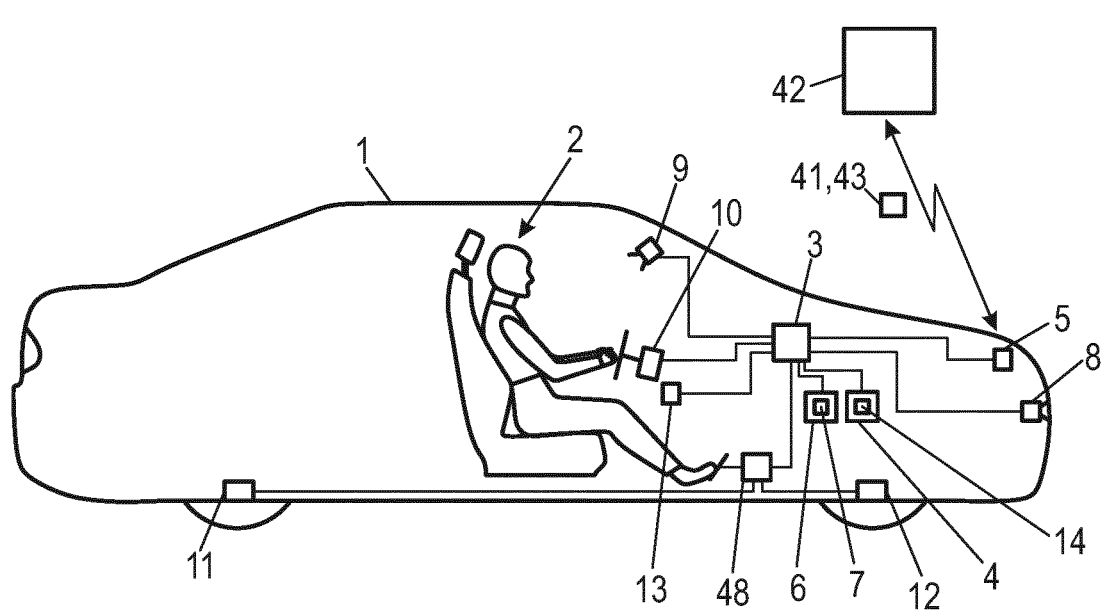
FIG. 2 illustrates the motor vehicle according to one embodiment.

FIG. 1 is a flowchart of a method for operating a motor vehicle, wherein a motor vehicle 1 implementing the method is shown schematically in FIG. 2.

In step S1, input data 22 are first determined, which relate to the motor vehicle 1 itself, the surroundings of the motor vehicle 1 and the user 2 of the motor vehicle. In the example, the input data relate to the route profile 15 and to a roadway condition 16 of route portions potentially driven by the motor vehicle 1. In order to determine these variables, position information 14 which describes the position of the motor vehicle 1 can first be obtained by a position determination device 4, for example a GPS sensor, after which a processing device 3 of the motor vehicle retrieves the mentioned information from map data 7 stored in a data memory 6 of the motor vehicle 1, for example in a navigation system.

In addition, weather conditions 17 are taken into account as input data 22—which, for example, can be received from an external device 42 or can be detected by a sensor system on the vehicle, which is not shown. Preferably, information 18 relating to traffic present in the surroundings of the vehicle and existing danger points, and information 19 received from other motor vehicles or infrastructure devices via the communication device 5, are also taken into account as input data 22.

Occupant information 20 which is also considered as input data 22 can in particular describe the mood and/or the state and/or a driving ability of the user 2. For example, the user 2 can be recognized by an personal vehicle key or via the sensor 9, which is a camera. A state, for example fatigue, can be detected by monitoring the eyelid blinking and/or steering movements or the like.

In addition, sensor data of the sensors 8-12, 48 of the motor vehicle 1 are taken into account as input data 22—i.e., for example, wheel speeds detected via the sensors 11, 12, a pedal position detected via the sensor 48, a steering angle detected via the sensor 10, image data of the interior which are detected via the sensor 9 and which can relate in particular to the user, and image data of at least one sensor 8, which can relate to the vehicle surroundings.

The input data 22 mentioned are purely exemplary, and it would also be readily possible to take into account only parts of the specified input data 22 and/or additional input data not discussed here.

With the determined input data 22, relatively accurate information about the current driving situation and/or about potential future driving situations is available to the processing device 3, such that it is possible to estimate which vehicle functions 28, 32, 44, 47 are potentially relevant for the further driving operation.

The following method steps serve, on the one hand, to indicate relevant vehicle functions 28, 32, 44, 47 to the user 2 of the motor vehicle 1, and on the other hand to train the driver and/or user for better use of the motor vehicle 1 and/or of its vehicle functions 28, 32, 44, 46. For this purpose, various trigger conditions 24, 51 are verified; if they are met, a notification 26, 45 is output regarding each corresponding activatable vehicle function 28, 32, 44, 47. If the user 2 confirms, by a corresponding operating action 27, 46, the activation, the corresponding vehicle function 28, 32, 44, 47 can be activated immediately—or only after an additional condition 31 has been met.

An example of an implementation is shown in detail in the flowchart in FIG. 1, and is explained in more detail below. For reasons of clarity, only a few trigger conditions 24, 51 and vehicle functions 28, 32, 44, 47 are considered in this case. In actual implementations, a considerably greater number of trigger conditions 24, 51 and vehicle functions 28, 32, 44, 47 can be incorporated in certain circumstances.

The left-hand branch of the flowchart shown in FIG. 1, which begins with step S2, serves to offer driving training to the user 2 in suitable driving situations, within which a further vehicle function 44—for example, a specific vehicle configuration such as a sport mode or a specific assistance system such as a lane guide assistant, can also be tested. In order to enable this, in step S2 all relevant route portions 23 which could potentially be used for such driving training are first selected. In this case, not only route portions 23 which are located on a planned or predicted route of the motor vehicle 1, but also route portions 23 which are located beyond this route—the starting point 30 of which, however, can be reached within a distance or travel time which is less than a prespecified distance threshold—are taken into account.

In step S3, the fulfillment of a trigger condition 24 is subsequently verified, which is only met if at least one of the route portions 23 satisfies a route portion condition 25. The route portion condition 25 should be met if the corresponding route portion 23 is suitable for a specific training task.

In the example, training regarding a sport driving will be implemented, such that the route portion condition 25 should only be met if the corresponding route portion 23 is demanding to drive. Since the profile of the route portion is known from the input data 22 relating to the route profile 15, such a verification test can be technically implemented, for example, by virtue of the fact that the average curvature and/or an angle between tangents of the corresponding curve at their end points, for one or more curves of the route portion, and/or a mean slope or mean absolute slope in the route portion 23 and/or a distance between successive curves in the route portion 23 are compared with corresponding thresholds. If the trigger condition 24 is not met because the route portion condition 25 is not met for any of the routes 23, the method is repeated from step S1.

If the trigger condition 24 is met, a notification 26 relating to the activatable vehicle functions 28, 32, 44 is output to the user 2—for example, via the user interface 13, which can be a touchscreen. The vehicle function 28 serves to guide the user to the starting point 30 of the route portion 23 to be used for the training, the vehicle function 32 serves for training itself, and the vehicle function 44 is an additional vehicle function, the use of which can be trained in the training—i.e., for example, a sport mode, the provision of increased power, or the like.

The notification can briefly describe the activatable vehicle functions 28, 32, 44—i.e., for example, inform the user 2 that a training opportunity or a test opportunity is located in the vicinity for a specific vehicle function 44.

In this case, the given notification 26 can in particular depend on whether an activation condition 40 for one of the vehicle functions 28, 32, 44 is met. In the example shown, the activation condition 40 is verified only for the additional vehicle function 44, since the vehicle functions 28, 32 for the training or preparation of the training should always be ready. The activation condition 40 can be met in particular if the vehicle function 44 can be activated at any time by the user 2. If, in contrast, the vehicle function 44 is not always activatable and/or is not enabled, it can be pointed out in the notification 26 that the vehicle function 44 is available only for training or test purposes or only for a specific time interval or the like.

As shown schematically in FIG. 2, to enable the vehicle function 44, it is possible for a corresponding message 41 to be received by a vehicle-external device 42. Alternatively, the enabling can take place internally by a prespecified operating action of the user 2, which, however, triggers a confirmation message 43 to the vehicle-external device 42. It can thus always be known in the vehicle-external device 42 whether or not the vehicle function 44 is enabled in the motor vehicle 1. This can serve, for example, to provide specific vehicle functions only to specific drivers or users which, for example, have paid a corresponding fee, or have carried out sufficient driver training in the vehicle function 32.

After the notification, in step S5, it is verified whether the user 2 has confirmed the activation of the vehicle functions 28, 32, 44 by carrying out a prespecified operating action 27—for example, a voice command, the touching of a certain part of a touchscreen, or the like. If this is not the case, the method is repeated from step S1.

If, in contrast, the prespecified operating action 27 is detected in step S5, instructions 29 are initially repeatedly output to the user 2 in step S6 in order to guide him to the starting point 30 of the route portion 23 used for training. In step S7, it is then verified in each case whether the additional condition 31—which is only met when the starting point 30 is reached—is met. As long as this is not the case, the output of the instructions 29 is repeated in step S6.

After the additional condition 31 has been met, the vehicle function 28 is terminated, and the vehicle functions 32 and 44 are activated. The vehicle function 32 which, in the example, serves to train the user 2 with respect to a sport driving behavior, will now be explained.

For this purpose, braking points 33, target driving lines 34, and target speeds 35 are first determined in step S8 for curves of the route portion 23. In addition, target accelerations 36 and/or target regenerations 37—i.e., for example, an amount of the energy regenerated per time unit, can be determined for different parts of the route portion 23.

The mentioned variables can be determined, for example, by simulating the driving operation along the route portion and minimizing a prespecified cost function, in particular with boundary conditions. Since sports driving is to be trained, the required time for driving the route portion 23 can in particular be minimized. In the simplest case, the boundary conditions can be specified by the traction limits of the motor vehicle 1. However, changes of these traction limits due to the weather are preferably taken into account, and additional tolerance ranges can be provided, for example, in order to take into account the capabilities of the user 2 or the like.

In step S9, the actual state of the motor vehicle 1 is determined—i.e., for example, an actual position on the route portion, a speed, an actual regeneration, etc.

On the basis of a deviation between the actual state determined in step S9 and the target parameters specified in step S8, instructions 38 are output in step S10 as to how the user 2 should modify his current behavior. For example, he can be prompted to brake, and/or to brake earlier or later in the following curves, the target driving line can be visualized for him, or the like.

In step S11, it is verified whether an end condition 39 is met—i.e., in particular whether the end of the route portion has been reached. If this is not the case, the method is repeated from step S8. If the end condition 39 is met in step S11, the training is concluded, and the method can return to step S1.

As explained above, in addition to the vehicle function 32, the vehicle function 44 will be used. It is therefore also activated in step S12 immediately after the additional condition 31 has been met. The vehicle function 44 can, for example, be a boost mode in which an electric motor of a hybrid motor vehicle is used to increase the driving power, or a change to a sport mode in which, for example, a chassis setting and/or a parameter of a drive train, for example a shifting speed, is adapted. Since the vehicle function 44 is activated together with the vehicle function 32 for the training, the user 2 can gain experience with the vehicle function 44 under controlled conditions, and thereby obtain an optimal use of the vehicle function 44, on the one hand. On the other hand, if said vehicle function requirements payment of a fee to be enabled, for example, it can be tested under optimal conditions.

In step S113, it is verified whether the activation condition 40 for the vehicle function 44 is met. If this is the case, the vehicle function 44 can remain active after the training, for example, until the user 2 manually deactivates it.

If, on the other hand, the activation condition 40 is not met, then in step S14 it is verified whether the end condition 39, which has already been discussed above, is met—i.e., in particular whether the end of the route portion has been reached. If this is the case, the vehicle function 44 is deactivated again in step S15, so that the vehicle function 44 can only be used in training if the activation condition is not met.

In the method explained, different trigger conditions 24, 51 can be provided for different associated vehicle functions 28, 32, 44, 47. A further trigger condition 51 for a further vehicle function 47 is explained below with reference to the right-hand branch of the flowchart shown in FIG. 1, beginning with step S16.

The vehicle function 47 implements an at least partially automated, in particular fully automated, driving operation, wherein the driver and/or user will be informed of the availability of this driving operation if, due to his degree of fatigue or degree attentiveness, the user 2 is potentially not able to optimally drive the vehicle.

For this purpose, a degree of fatigue 49 and/or an attentiveness state 50 is first determined in step S16. The determination of the mentioned variables is known in principle from the prior art, and therefore will not be explained in detail.

In step S17, the trigger condition 51 is subsequently verified by comparing the degree of fatigue 49 and the state of attention 50 with a corresponding threshold. If the trigger condition 51 is not met, the method is repeated from step S1.

If, on the other hand, the trigger condition 51 is met, the notification 45 is output in step S18. On the one hand, this can prompt the driver and/or user to concentrate on driving, or to take a break from driving if the degree of fatigue is too high. On the other hand, however, as an alternative, the use of the vehicle function 47 can be offered to the driver and/or user, which relieves him with at least partially automated driving, and thus, under certain circumstances, can enable further driving operation even with a given degree of fatigue or attentiveness, at least up to a suitable rest location.

In step S19, it is then verified whether the activation of the vehicle function 47 has been confirmed by a corresponding operating action 46. If this is the case, the vehicle function 47 is activated in step S20, such that an at least partially-automated driving of the motor vehicle 1 takes place. Otherwise, the method returns directly to step S1.

The invention claimed is:

1. A method for operating a motor vehicle comprising:
    determining input data, wherein the input data relates to the motor vehicle, an environment of the motor vehicle, and/or a user of the motor vehicle;
    determining if a trigger condition is fulfilled, the determining including evaluating at least one trigger condition based on the input data;
    outputting a notification when the trigger condition is fulfilled, wherein the notification is assigned to the trigger condition;
    detecting a pre-specified operating action;
    based on detecting the pre-specified operating action, activating a vehicle function, wherein the vehicle function is activated at least immediately or after an additional condition is met, and wherein, if the additional condition is not met, the vehicle function is activated temporarily beginning with the pre-specified operating action being detected and ending upon a further additional condition being met; and
    automatically guiding the motor vehicle based on the activated vehicle function.

2. The method according to claim 1, further comprising:
    repeatedly outputting the vehicle function, wherein the input data is a route portion, the route portion being currently travelled or potentially travelled, and
    wherein the repeatedly outputting the vehicle function includes guiding the motor vehicle to a starting point and/or outputting instructions to the user for an optimal driving behavior with respect to at least one target variable within the route portion.

3. The method according to claim 2, wherein the vehicle function is
    a braking point and/or,
    a target driving line and/or,
    a target speed and/or,
    a target acceleration and/or,
    a target regeneration for at least one part of the route portion is specified for at least one curve in the route portion, and
    wherein at least one of the instructions relates to the braking point and/or the target driving line and/or the target speed and/or the target acceleration and/or the target regeneration.

4. The method according to claim 3, wherein the outputting of the instructions further comprises permanently activating a further vehicle function, or activating the further vehicle function when a further additional condition is met, or implementing, based on the pre-specified operating action and/or the input data, a driver assistance system and/or implementing a change in a configuration of a drivetrain and/or of a chassis and/or of an assistance system of the motor vehicle before or when the route portion is reached.

5. The method according to claim 1, wherein the trigger condition includes a route portion condition that is fulfilled when the route portion of a route of the motor vehicle is within a determined distance and/or a travel time, each of which is less than a pre-specified distance threshold.

6. The method according to claim 5, wherein the route portion condition is fulfilled when an average curvature and/or an angle between tangents of a corresponding curve at its end points, for one or more curves of the route portion, and/or a mean slope or mean absolute slope in the route portion, exceed a corresponding pre-specified threshold, and/or if a distance between successive curves in the route portion falls below a pre-specified threshold.

7. The method according to claim 1, wherein content of the notification depends on whether an activation condition for the vehicle function assigned to the trigger condition is fulfilled.

8. The method according to claim 1,
    wherein the vehicle function and/or a further vehicle function are activated if an activation condition assigned to the vehicle function is fulfilled, regardless of the trigger condition being fulfilled, or
    wherein, if the activation condition is not fulfilled, the vehicle function and/or the further vehicle function are activated exclusively if the trigger condition is fulfilled; or
    wherein, if the activation condition is not fulfilled, the vehicle function and/or the further vehicle function are temporarily activated after a detection of a pre-specified operating action, wherein a temporary activation lasts until an end condition is met.

9. The method according to claim 8,
    wherein the activation condition is fulfilled depends on whether a message is received from a vehicle-external device, and/or
    wherein the activation condition is fulfilled depends on a detection of a pre-specified further operating action of the user, wherein the pre-specified further operating action triggers a transmission of a confirmation message to the vehicle-external device.

10. The method according to claim 1, wherein the input data comprises at least one of the following:

a route profile and/or map data relating to a roadway condition;

position information relating to a position of the motor vehicle;

occupant information related to the user, the occupant information relating to a mood and/or a state and/or a driving ability of the user;

sensor data from sensors of the motor vehicle;

weather conditions of surroundings of the motor vehicle;

information on traffic and/or dangerous situations in the surroundings; and/or information received from other motor vehicles and/or infrastructure devices.

11. The method according to claim 1, further comprising:

determining a degree of fatigue and/or an attentiveness state of the user based on the input data relating to the user of the motor vehicle, wherein the fulfillment of the trigger condition or one of the trigger conditions depends on a degree of fatigue and/or attentiveness state, and wherein, if the trigger condition is fulfilled, a notification is output to the user to indicate that an at least partially automated driving operation is available as an activatable vehicle function.

12. A motor vehicle comprising:

a controller configured to:

determine input data, wherein the input data relates to the motor vehicle, an environment of the motor vehicle, and/or a user of the motor vehicle;

determine if a trigger condition is fulfilled, the determining including evaluating at least one trigger condition based on the input data;

output a notification when the trigger condition is fulfilled, wherein the notification is assigned to the trigger condition;

detect a pre-specified operating action;

based on detecting the pre-specified operating action, activate a vehicle function, wherein the vehicle function is activated at least immediately or after an additional condition is met, and wherein, if the additional condition is not met, the vehicle function is activated temporarily beginning with the pre-specified operating action being detected and ending upon a further additional condition being met; and automatically guiding the motor vehicle based on the activated vehicle function.

* * * * *